United States Patent [19]

Shimizu et al.

[11] 3,755,883
[45] Sept. 4, 1973

[54] MANUFACTURING A SPIRAL MULTI-LAYER PIPE

[75] Inventors: Dengo Shimizu; Masao Tasaka; Kunihiko Saotome, all of Hiroshima, Japan

[73] Assignee: Mitsubishi Jukogyo Kabushiki Kaisha, Tokyo, Japan

[22] Filed: Aug. 27, 1971

[21] Appl. No.: 175,497

Related U.S. Application Data

[63] Continuation-in-part of Ser. No. 798,631, Dec. 31, 1970, abandoned.

[52] U.S. Cl. ................................. 29/476.5, 29/481
[51] Int. Cl. ............................................. B23k 31/02
[58] Field of Search ..................... 29/471.1, 473.3, 29/473.9, 474.1, 475, 476.5, 480, 481

[56] References Cited
UNITED STATES PATENTS 1,594,526  8/1926  Hume .......................... 29/476.5 X
2,104,884  1/1938  Quarnstrom .................. 29/476.5 X
3,092,148  6/1963  Carstens ...................... 29/473.9 X
3,163,183  12/1964  Sagara .............................. 138/144

FOREIGN PATENTS OR APPLICATIONS

39/12688  1964  Japan

Primary Examiner—Richard B. Lazarus
Attorney—George B. Oujevolk

[57] ABSTRACT

A method of manufacturing a multi-layer pipe for pressure apparatus purposes, which pipe consists of a hoop spirally wound around and fastened to the outer surface of an inner cylinder, characterized in that a wedge-shaped filler and the hoop, held together in a body, are fixed to each other by tack welds at both sides of the wedge-shaped filler at the end leading to the inner cylinder, then they are wound around the inner cylinder and the tack welds are removed after forming a starting laminate of many layers of the hoop, and then are wound again to complete the whole laminate.

4 Claims, 6 Drawing Figures

Patented Sept. 4, 1973    3,755,883

Dengo Shimizu
Masao Tasaka
Kunihiko Saotome
INVENTORS

BY George B. Oujevolk
Attorney

MANUFACTURING A SPIRAL MULTI-LAYER PIPE

BACKGROUND OF THE INVENTION

This application is a continuation-in-part of U. S. Pat. application Ser. No. 798,631, filed Dec. 31, 1970 and now abandoned.

This invention relates to a method of manufacturing a spiral multi-layer pipe in conformity with U.S. Pat. No. 3,163,183, using a new process for securing a wedge-shaped filler to the inner cylinder of the spiral multi-layer pipe.

U. S. Pat. No. 3,163,183 discloses a method of manufacturing a spiral multi-layer pipe consisting of a spiral hoop coil having an outer cylinder and an inner cylinder and interposing wedge-shaped fillers, each of which is gradually reduced in thickness for a distance several times greater than the thickness of the hoop coil between the ends of the spiral hoop coil and the adjacent layers to fill up the wedge-shaped spaces occurring therebetween.

SUMMARY OF THE INVENTION

Generally speaking, the present invention contemplates a method of manufacturing a multi-layer pipe for pressure apparatus purposes, which pipe consists of a hoop spirally wound around and fastened to the outer surface of an inner cylinder. The characteristic feature of the invention is that a wedge-shaped filler and a hoop welded together in a body are secured by tack welds at both sides of the leading end to the inner cylinder and they are wound around the inner cylinder and then the tack welds are removed after forming only a starting laminate of the many layers of the hoop.

The invention will be explained in detail with reference to the accompanying drawings, illustrating a preferred embodiment.

DETAILED DESCRIPTION

To better explain the present invention it is essential that the prior art method of manufacturing a multi-layer pipe be understood. In the prior art method, a wedge-shaped filler 2 of the same width as that of the outer surface of an inner cylinder 1 of a spiral multi-layer pipe is first secured to said outer surface in four positions by welding.

Then, the thick-walled end of the wedge filler is securely connected to the leading end of a spiral hoop 4 and to the outer surface of the inner cylinder by a longitudinal weld 5.

Figure 1A:
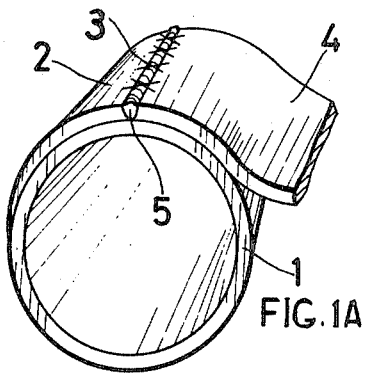
FIGS. 1A and 1B are views showing a process of fixing a wedge-shaped end filler to the inner cylinder of a spiral multi-layer pipe using a conventional method of the prior art for manufacturing a spiral multi-layer pipe.
Figure 1B:
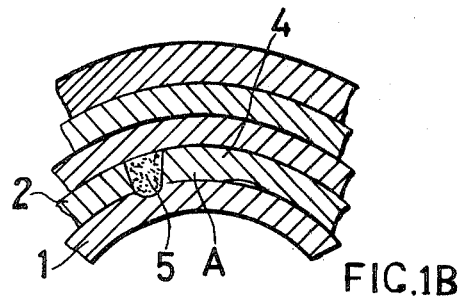

The winding process may be started when the hoop 4 keeps the desired tension as it is wound around the inner cylinder 1. In the winding process the outer layers of the hoop 4 are given great hoop tension and the inner layers of the hoop 4 are given great hoop compression, the adjacent layers of the hoop are adapted to slip in relation to each other, the innermost layer causes collapse and a gap between the same and the inner cylinder 1 at A as shown in FIG. 1B and hinders the fastening effect of the laminated coil. In the working operation, the multi-layer pipe obtained by the above mentioned technique, since it is given large tensile hoop stress by applied inner pressure, is also subjected to great stress concentration at A, as shown in FIG. 1B, thus weakening the strength of the pipe. Moreover, when the wedge filler 2 and the hoop 4 are to be secured to the outer surface of the inner cylinder 1 made of a special material by welding, some preheating procedure may be necessary, as the case may require, but it becomes difficult to maintain preheating temperatures with an increase in the thickness of the inner cylinder 1. In fact, it often leads to thermal distortion of the wedge filler 2 and the hoop 4, exerting a bad effect on the quality and cost of the product.

DESCRIPTION OF PREFERRED EMBODIMENTS

FIGS. 2A, 2B, 2C and FIG. 3 show an embodiment of the present invention.

A wedge-shaped filler 12, as a part of a hoop 11, is welded to one end of the hoop. Then the hoop 11 is placed on the surface of an inner cylinder 13 under a coiling apparatus of the three-roll type, in such a manner that the part of the wedge filler 12, a little ahead of the weld line between the wedge-shaped filler 12 and the hoop 11, may contact the inner cylinder 13. By pressing down said contacting part by means of an upper roll 15 of the coiling apparatus via a block 14, the hoop is kept immovable in position. At the same time, the inner cylinder 13 is supported by two lower rolls 17.

Figures 2A, 2B, 2C:
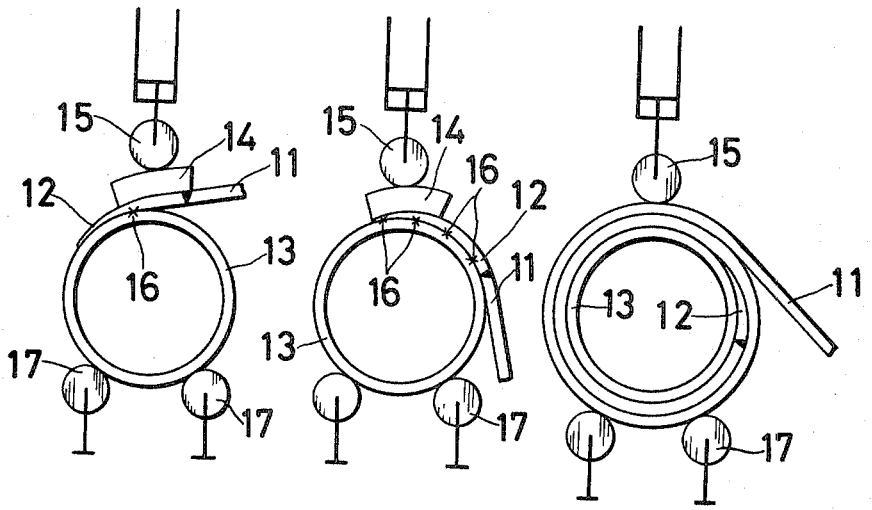
FIGS. 2A, 2B and 2C show a series of views illustrating a process by which said wedge-shaped end filler and inner cylinder are secured to each other using the manufacturing method of the present invention.
Figure 3:
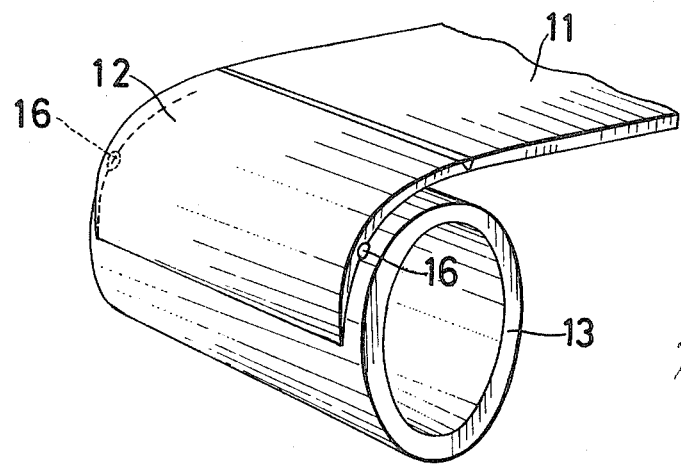
FIG. 3 is a perspective view showing portions of FIG. 2A.

The contact surfaces of the wedge-shaped filler 12 and the inner cylinder 13 are secured to each other by tack welds at both sides (See FIG. 2A and FIG. 3). The upper roll 15 of the coiling apparatus is driven to cause the common contact line of the inner cylinder 13 and the wedge-shaped filler 12 to move forward in the direction of the terminal end of the wedge-shaped filler 12, and both sides thereof are secured again by tack welds in other positions. By repeating this tack welding, both sides of the wedge-shaped filler 12 are fixed to the inner cylinder 13 by tack welds 16 in many positions (See FIG. 2B).

Then, the rolls of the coiling apparatus are rotated in predetermined directions and at the same time, the upper roll 15 is forced down so that the hoop can be wound around the inner cylinder 13 (See FIG. 2C).

After a starting laminate of six layers of the hoop 11 have been formed, the coiling apparatus is made to stop and the tack welds 16 are removed by cut-off means. The coiling apparatus is driven again to complete the lamination of 40 layers of the hoop 11.

In this way, the layers of the hoop 11 are wound tightly according to the principle described in the specification of the above mentioned U. S. Pat. No. 3,163,183, and the outer layers of the hoop 11 are given great hoop tension.

However, the wedge-shaped filler 12 and the hoop 11, not secured to the inner cylinder 13, have relative slip between the adjacent layers of the hoop 11 and the inner cylinder 13 and do not cause a collapse or gap, as shown in FIG. 1B.

In order to facilitate the tack welding 16 and the cutting-off of the welds thus formed, it is desirable that the hoop 11 and the wedge-shaped filler 12 are a little narrower than the inner cylinder 13 (See FIG. 3).

According to the present invention, the wedge-shaped filler 12 and the hoop 11 are secured together in a body before being tack-welded to the inner cylinder 13 and therefore, the working operation is not only simplified, but the checking of the welds is easy. In addition, the tack welding makes the winding start of the hoop easy and the removal of the tack welds make the contact effect between the layers secure.

Moreover, since the fastening between the inner cylinder material and the wedge-shaped filler can be achieved by light tack welding, an inner cylinder of any material can be used with a simple preheating treatment, but without the danger of thermal distortion or other undesirable effects.

We claim:

1. A method of manufacturing a multi-layer pipe for pressure apparatus purposes, which pipe consists of a hoop spirally wound around and fastened to the outer surface of an inner cylinder comprising the steps of:
   a. placing a wedge-shaped filler on the inner cylinder, said filler outer end being secured by welding to the leading end of the hoop, the longitudinal axis of the filler and hoop material being aligned with the plane perpendicular to the axis of the cylinder;
   b. spirally wrapping said filler and hoop around said cylinder while tack welding the longitudinal edges of the filler to said cylinder ends; and,
   c. removing said tack welds after forming a starting laminate and winding the hoop again to complete the whole laminate.

2. A process of manufacturing a multi-layer pipe for pressure apparatus purposes which pipe consists of a hoop spirally wound around and fastened to the outer surface of an inner cylinder, comprising the steps of:
   a. placing an inner cylinder in contact with two spaced apart rollers;
   b. placing a wedge-shaped filler on said cylinder, said filler being secured by welding to the leading end of the hoop, the longitudinal axis of the filler and hoop being aligned with the plane perpendicular to the axis of the cylinder and pressing down on said filler with a curved block to force said filler shape to conform to the cylinder curve while pressing down on said block with a roller;
   c. tack welding the longitudinal edges of the filler to the surface of said cylinder while curving said filler around said cylinder;
   d. spirally winding said hoop material around said cylinder; and,
   e. removing said tack welds after forming a starting laminate and winding the hoop again to complete the whole laminate.

3. A method of manufacturing a multi-layer pipe for pressure apparatus purpose, which pipe consists of a hoop spirally wound around and fastened to the outer surface of an inner cylinder, comprising the steps of:
   a. placing a wedge-shaped filler on the inner cylinder, said filler and hoop being held together in a body, the longitudinal axis of the filler and hoop material being aligned with the plane perpendicular to the axis of the
   b. spirally wrapping said filler and hoop around said cylinder while tack welding the longitudinal edges of the filler to said cylinder ends; and,
   c. removing said tack welds after forming a starting laminate and winding the hoop again to complete the whole laminate.

4. A process of manufacturing a multi-layer pipe for pressure apparatus purposes which pipe consists of a hoop spirally wound around and fastened to the outer surface of an inner cylinder, comprising the steps of:
   a. placing an inner cylinder in contact with two spaced aprart rollers;
   b. placing a wedge-shaped filler on said cylinder, said filler and hoop held together in a body, the longitudinal axis of the filler and hoop being aligned with the plane perpendicular to the axis of the cylinder and pressing down on said filler with a curved block to force said filler shape to conform to the cylinder curve while pressing down on said block with a roller;
   c. tack welding the longitudinal edges of the filler to the surface of said cylinder while curving said filler around said cylinder;
   d. spirally winding said hoop material around said cylinder; and,
   e. removing said tack welds after forming a starting laminate and winding the hoop again to complete the whole laminate.

* * * * *

UNITED STATES PATENT OFFICE
CERTIFICATE OF CORRECTION

Patent No. 3,755,883   Dated September 4, 1973

Inventor(s) Dengo Shimizu et al.

It is certified that error appears in the above-identified patent and that said Letters Patent are hereby corrected as shown below:

On the cover sheet insert item -- [30] Foreign Application Priority Data February 15, 1968 Japan 9557/1968 --.

Signed and sealed this 19th day of March 1974.

(SEAL)
Attest:

EDWARD M. FLETCHER, JR.　　　C. MARSHALL DANN
Attesting Officer　　　　　　Commissioner of Patents